United States Patent [19]
Waltel, Jr.

[11] Patent Number: 4,887,388
[45] Date of Patent: Dec. 19, 1989

[54] IRRIGATION SYSTEM FOR COMMERCIAL PLANT CULTIVATION

[76] Inventor: Joseph Waltel, Jr., 10 Ruland Rd., Melville, N.Y. 11747

[21] Appl. No.: 260,473

[22] Filed: Oct. 19, 1988

[51] Int. Cl.⁴ ............................................. H01G 25/00
[52] U.S. Cl. ............................................. 47/79; 47/85; 47/48.5; 47/77
[58] Field of Search .................. 47/79, 73, 85, 86, 60, 47/61, 62, 64, 77, 48.5, 79, 80, 81, 82, 66

[56] References Cited

U.S. PATENT DOCUMENTS

| | | | |
|---|---|---|---|
| 3,603,034 | 9/1971 | Maxwell-Stewart | 47/79 |
| 3,613,309 | 10/1971 | Coburn | 47/79 |
| 3,660,933 | 5/1972 | Wong | 47/62 |
| 3,778,928 | 12/1973 | Green | 47/80 |
| 4,334,386 | 6/1982 | Burcombe et al. | 47/62 |

Primary Examiner—Richard J. Johnson
Assistant Examiner—Lynda M. Cofsky

[57] ABSTRACT

In a system for commercial cultivation of plants and flowers, an open tray with recesses for readily inserting and removing flower pots having growing plants therein and using a so-called "ooze" tube (U.S. Pat. No. 3,613,309) disposed centrally between adjacent rows of said flower pots which waters the plants at approximately the rate of plant absorption of the supplied liquid, so that any water-borne disease spreading among the plants is minimized because of little or no overflow of supplied water from one flower pot to another.

1 Claim, 2 Drawing Sheets

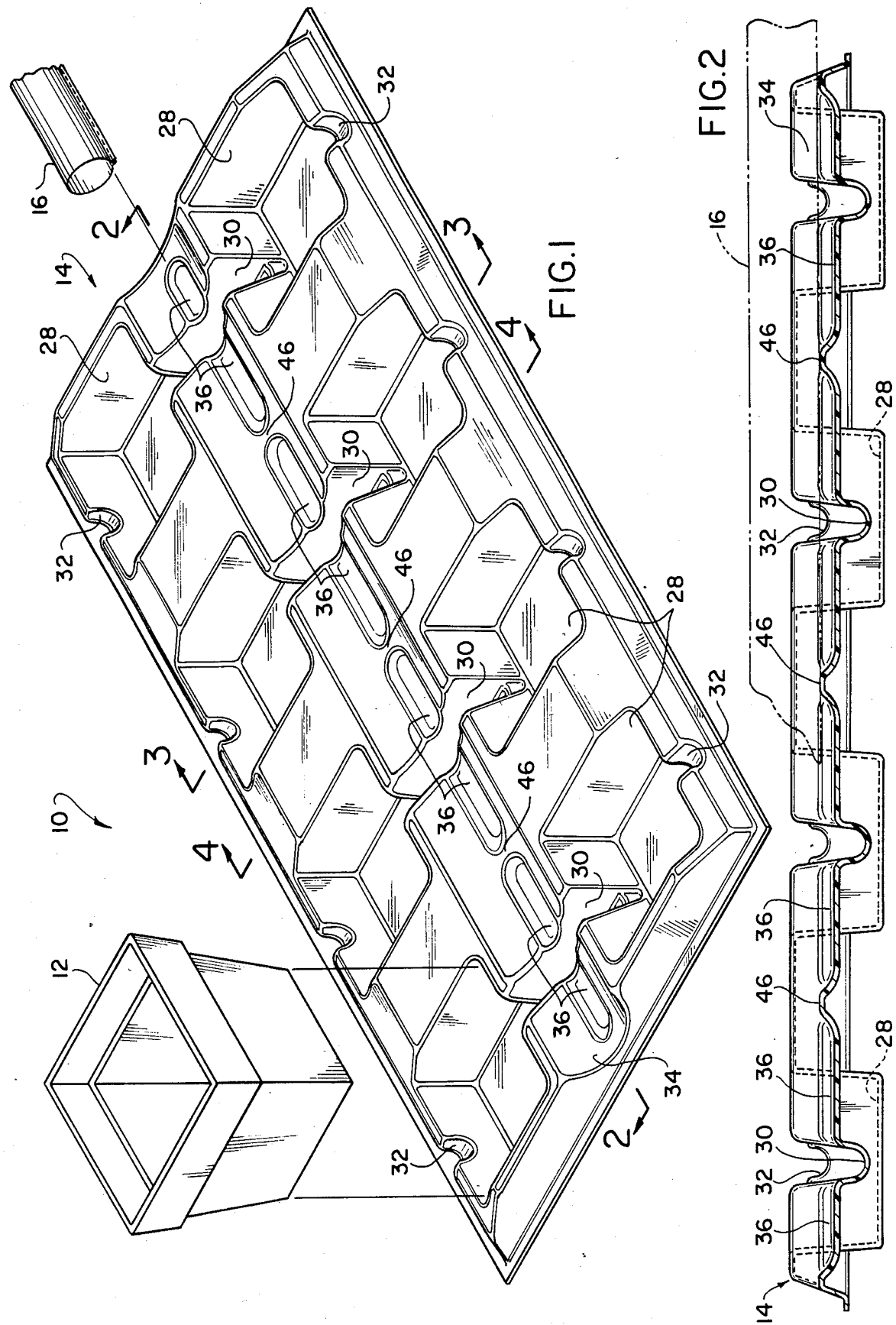

IRRIGATION SYSTEM FOR COMMERCIAL PLANT CULTIVATION

The present invention relates to improvements in plant cultivation, as occurs in a greenhouse or the like, and more particularly to an irrigation system for commercial plant cultivation which has an optimum water use efficiency, and significant safeguards against the spread of fungi, bacteria and viruses, or the like, among the plants.

THE PRIOR ART

Illustrative of an irrigation system that typically may be used in a greenhouse is one which supplies water to the plants from above, and is effective in the early stages of growth. However, eventually the plant starts to flower and the leaves prevent the overhead water from reaching the earth of the individual plants. Another prior art technique is to run from a main conduit individual tubes that have a weight at the end and are placed in each individual plant pot, the weight keeping the end in place. The drawback of this is that the individual placement in the pots or baskets is tedious.

Still another prior art technique is one that consists of placing the plant baskets in an open tray, filling the tray with water and then allowing the water to be sucked up by the earth and plants from below. The drawback of this is that if there is one "diseased" plant in the batch, such plant for example having "root rot," all of the plants become infected.

EXAMPLE OF THE PRIOR ART

To prevent disease contamination in commercial plant cultivation, use may be made of the irrigation system of U.S. Pat. No. 3,613,309 issued on Oct. 19, 1971 to Coburn which discloses the use of a water tube 20, specifically described as being "so controlled as to permit liquid to ooze out along its length at a predetermined rate." Each tube 20, aptly called an "ooze tube," is enclosed in a plant bag which insulates the individual plants from each other.

Underlying the present invention is the recognition that advantageous use can be made of the "controlled flow" inherent in the operating mode of the "ooze tube" to prevent inter-plant contamination without resorting, as did Coburn, to physically isolating the plants from each other. In the within inventive irrigation or watering system, the plants are thus handled more conveniently in open trays, and the slow exiting flow of the "ooze tube" is at a rate which is, for all practical purposes, all used up, by absorption of growing aggregate and soil and by capillary action by the plants, so that there is no "excess" water-borne disease transmitted among the plants, all as will be explained and described in greater detail subsequently herein, as well as other safeguards against disease transmission embodied in the inventive watering system.

The description of the invention which follows, together with the accompanying drawings should not be construed as limiting the invention to the example shown and described, because those skilled in the art to which this invention appertains will be able to devise other forms thereof within the ambit of the appended claims.

BRIEF DESCRIPTION OF THE DRAWING

FIG. 1 is a perspective view of the three main components, i.e. tray, basket and watering tube, of the within inventive plant watering system;

FIG. 2 is a cross section, taken along line 2—2 of FIG. 1 of the tray component;

DETAILED DESCRIPTION OF A PREFERRED EMBODIMENT

Figure 3:
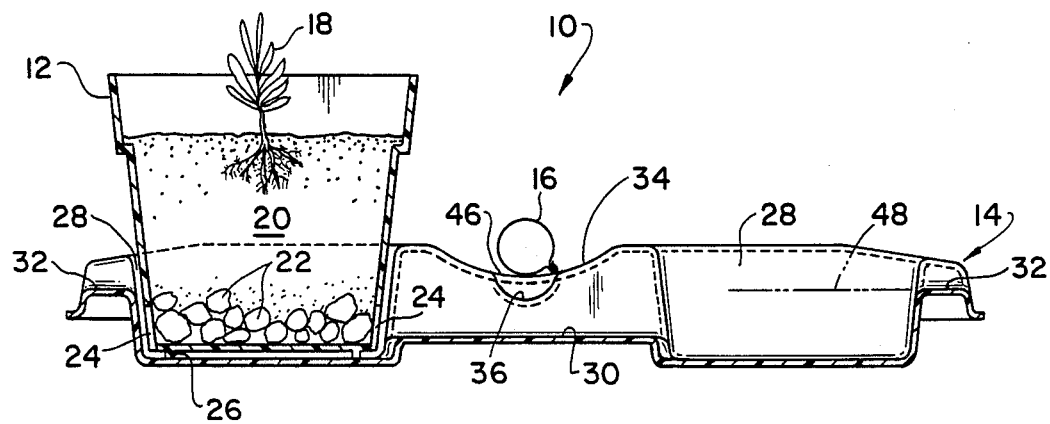
FIGS. 3 and 4 are cross section views, respectively taken along lines 3—3 and 4—4 of FIG. 1.
Figure 4:
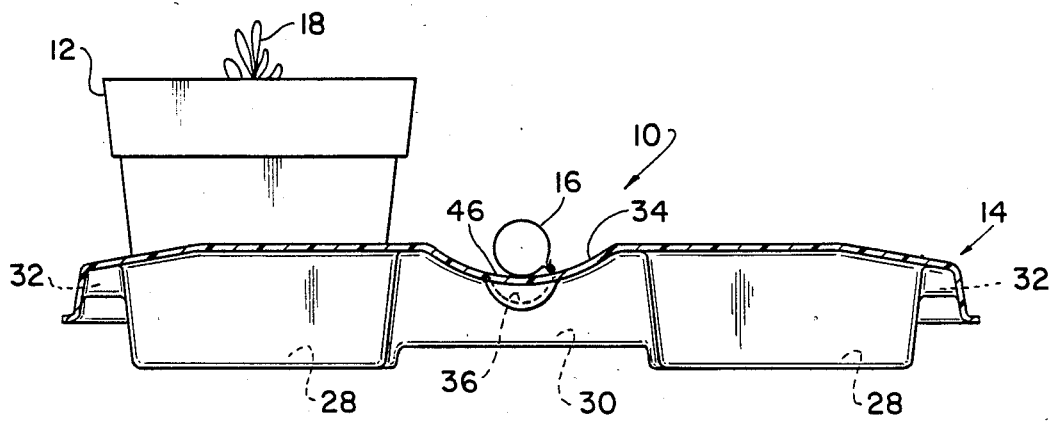

In FIGS. 1, 3 and 4 all of the components for the within plant growing system 10 are shown, the same consisting of plural baskets or pots 12, disposed in practice in a cooperating tray 14, and serviced by "ooze tubing" 16.

Figure 5:
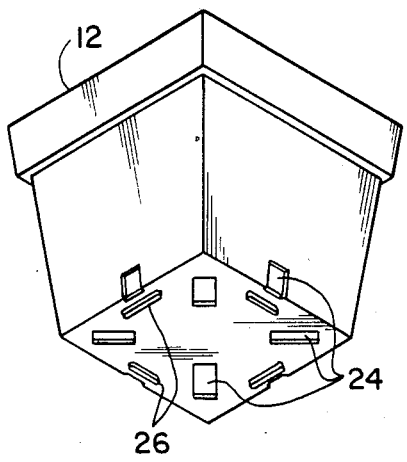
FIG. 5 is a perspective view of the flower basket or pot component, as seen from below.

Young plants 18 are customarily grown in individual pots 12 in a selected soil mix 20, as shown best in FIG. 3. For drainage purposes, pot 12 is first prepared with a sub layer of aggregate 22. Aggregate 22 permits a free flow of water and air to the roots of the plant 18 in cooperation with multiple drainage ports 24, as best shown in FIG. 5. An array of stand-offs 26, which slightly raise each pot, are provided to assist in the free-flow of the water and air delivery to the plants.

In FIG. 1 the tray 14, which preferably is plastic and vacuum formed, is shown to have an orderly grouping of wells 28 to receive a like group of plants 18 in pots 12. Each well 28 is formed to include an overflow weir 32 and each pair of wells 28 is joined by a cross trough 30. Orthogonally related to each cross trough 30 is a common, shallow center trough 34 which extends along and for the entire linear size of tray 14. Also in alignment with trough 34 and adjacent each cross trough 30 is a pair of slightly deeper drain troughs 36.

Figure 6:
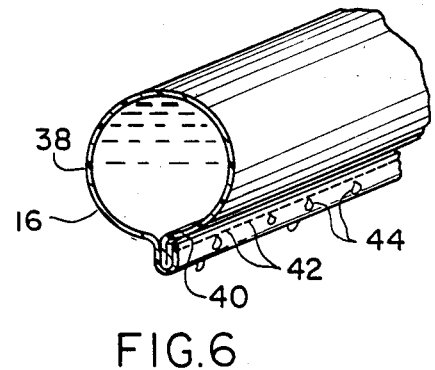
FIG. 6 is a perspective view of the watering tube or so-called "ooze tube", used in the inventive system.

The "ooze tube" 16, somewhat similar to that disclosed in U.S. Pat. No. 3,613,309 issued on Oct. 19, 1971 is shown in FIG. 6 in the manner in which it is used in this inventive watering system. Constructionwise it is a long piece of flexible plastic sheet 38 which has its edges folded and brought together by stitching itself, as at 42, to form the tubing 16. When one end of tubing 16 is closed, as by clamps (not shown), the tubing 16 "fills out" as illustrated. Depending on the water pressure within tubing 16, water will then ooze through the holes formed by the stitching 42 and form droplets 44 which exit along the length of the tube.

In practice, a selected number of trays 14 are set out end to end on tables or benches. Plants 18 in pots 12 are then inserted in each of wells 28. Each row of trays 14 is allocated a cooperating "leg" of "ooze tubing" 16 which is seriately laid in center troughs 34. The tubing "legs" 16 are supplied with water from a manifold or other appropriate supply. When the water is turned on, pressure throughout the system, for practical purposes, is evenly distributed. That is, because of slow droplet 44 formation, no substantial flow and pressure drop occurs within the system of "ooze tubing" 16. As seen best in FIGS. 3 and 4, "ooze tube" 16 rests on bridge members 46 which are formed at the bottom of the center trough 34 at the location where the drain troughs 36 terminate.

When pots 12, trays 14 and "ooze tube" 16 have been arranged for a set of plants 18, use will be made of an appropriate watering schedule, which may be manually activated or automatically controlled. As already noted, when pressure within the tube 16 is adequate, droplets 44 form along stitching 42, and these droplets continuously formed and oozing from the tube 16 run into or drop into drain troughs 36 where they accumulate and drain into the cross troughs 30. Wells 28 act as reservoirs as incoming water builds to the level 48 shown in FIG. 3. That is, at level 48 the water reaches the level of overflow weir 32 and thus there can be no further rise therein. Meanwhile, the saturated aggregate 22 and soil 20 will be understood to have transported some of the incoming water to the roots of the plants 18 by capillary action.

Factors best determined by the plant caretaker will influence how long and how often water pressure is to be maintained within tubing 16. Any excess water in wells 28 will drain away through weirs 32. When the water is turned off, the remaining water within well 28 will evaporate from the surface of soil 20.

The plastic sheet 38 used to make tubing 16 and the plastic used to form trays 24 are selected to both have a non-wettable surface characteristic. Because of this, water on these surfaces tend to "bead" and roll off by gravity without wetting and thereby remaining on the plastic components, thereby eliminating water transport of fungi, bacteria and viruses among the plants 18.

It is also noted that throughout the growing interval in the trays 14 that only two plants are "connected" waterwise. Thus, should one plant have a water borne disease problem, cross contamination by water can only affect its mate plant through cross trough 32.

From the foregoing description it should be readily appreciated that the within plant growing system 10 provides for adequate plant watering with high water use efficiency, and without the usual shortcomings inherent in prior art systems.

While the particular plant-watering components and their method of use herein shown and disclosed in detail are fully capable of attaining the objects and providing the advantages hereinbefore stated, it is to be understood that they are merely illustrative of the presently preferred embodiment of the invention an that no limitations are intended to the detail of construction or design herein shown other than as defined in the appended claims.

What is claimed is:

1. An irrigation system for growing plants located in individual containers, comprising a flexible, liquid-impervious hose having means therein for emitting therefrom liquid at a controlled rate along the length thereof, a plurality of individual plant-accepting containers, each of said containers having liquid-passing means therein to allow the entry of liquid into the interior thereor for absorption by growing media and plants therein, and a tray body having plural recesses for accommodating said individual containers, said recesses being arranged in pairs along two rows extending along opposite sides of said tray body, and a central groove extending along the length of said tray body between said rows of recesses for receiving said liquid-supplying hose and for discharging the liquid emitted therefrom laterally into said pairs of plural recesses at discrete locations along said groove for absorption by said growing media and plants located in said individual containers, the flow rate for said hose being selected to match the rate of absorption of said liquid to minimize liquid transfer between said plural recesses, and for each adjacent pair of recesses a first transverse connecting passage for channeling the discharge from said hose into said recesses, and a second transverse passage on the opposite side of each said recess for discharging to a remote area any excess of said liquid channelled to said recess.

* * * * *